US012682074B2

(12) United States Patent
Neugschwandtner et al.

(10) Patent No.: US 12,682,074 B2
(45) Date of Patent: Jul. 14, 2026

(54) STATIC VALIDATION OF MACHINE CODE FOR SECURITY PROPERTIES

(71) Applicant: Oracle International Corporation, Redwood Shores, CA (US)

(72) Inventors: Matthias Neugschwandtner, Perchtoldsdorf (AT); William Blair, Washington, DC (US); Lukas Stadler, Linz (AT); Matteo Oldani, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 65 days.

(21) Appl. No.: 18/615,033

(22) Filed: Mar. 25, 2024

(65) Prior Publication Data

US 2025/0245347 A1     Jul. 31, 2025

Related U.S. Application Data

(60) Provisional application No. 63/627,318, filed on Jan. 31, 2024.

(51) Int. Cl.
| | |
|---|---|
| *G06F 21/57* | (2013.01) |
| *G06F 8/41* | (2018.01) |
| *G06F 21/56* | (2013.01) |

(52) U.S. Cl.
CPC ............ *G06F 21/577* (2013.01); *G06F 8/433* (2013.01); *G06F 21/563* (2013.01)

(58) Field of Classification Search
CPC ....... G06F 21/577; G06F 8/433; G06F 21/563
See application file for complete search history.

(56) References Cited

U.S. PATENT DOCUMENTS

| | | | |
|---|---|---|---|
| 9,330,028 B2 | 5/2016 | Maniatis | |
| 11,340,901 B2 | 5/2022 | Piry et al. | |

(Continued)

FOREIGN PATENT DOCUMENTS

| | | |
|---|---|---|
| KR | 2020/0008799 | 1/2020 |
| KR | 2020/0131383 | 11/2020 |

(Continued)

OTHER PUBLICATIONS

Chacko et al., "Validation of Embedded Software through Static Analysis of Machine Codes", 2009. (Year: 2009).*

(Continued)

*Primary Examiner* — Trong H Nguyen
(74) *Attorney, Agent, or Firm* — Hickman Becker Bingham Ledesma LLP

(57) ABSTRACT

Novel graph analytics herein detect security violations in machine code. Here is static validation of machine code for detecting policy violations in an accelerated way that analytically generates a control flow graph from misaligned sequences of instructions that may, for example, partially overlap (i.e. share some of the bytes) in a memory buffer. In a first analytic phase, entry points into machine code are discovered. The entry points are starting points of control flow analysis that generates a directed control flow graph (CFG) in a second analytic phase. In a third analytic phase, interchangeable and combinable security policies implement the graph analytics in a flexible way that can be customized for a processor and its instruction set architecture (ISA). This approach will quantifiably increase the reliability of a computer that executes untrusted code such as an open source library or tenant logic in a multitenant environment such as a public cloud.

16 Claims, 4 Drawing Sheets

201 Detect first sequence of instructions in sequence of bytes of executable code 202 Based on first sequence of instructions, detect second sequence of instructions in sequence of bytes of executable code 203 Based on all discovered sequences of instructions, generate control flow graph 204 Based on control flow graph, detect security violation in executable code

(56) References Cited

U.S. PATENT DOCUMENTS

| | | | | |
|---|---|---|---|---|
| 2009/0222791 A1* | 9/2009 | Togawa | ................ | G06F 8/4442 |
| | | | | 717/110 |
| 2010/0275186 A1* | 10/2010 | McGarvey | .......... | G06F 11/3604 |
| | | | | 717/131 |
| 2018/0095764 A1* | 4/2018 | Sultana | ................ | G06F 9/3806 |
| 2019/0205136 A1 | 7/2019 | Hu et al. | | |
| 2020/0257804 A1 | 8/2020 | Chen | | |
| 2021/0264020 A1 | 8/2021 | LeMay et al. | | |

FOREIGN PATENT DOCUMENTS

| | | |
|---|---|---|
| KR | 102335475 | 12/2021 |
| WO | WO2023/101574 | 6/2023 |

OTHER PUBLICATIONS

Zeng, "Static Analysis on Binary Code" https://engineering.lehigh.edu/sites/engineering.lehigh.edu/files/_DEPARTMENTS/cse/research/tech-reports/2012/lu-cse-12-001.pdf 19 pages (2012).

Veracode, "Static Code Analysis" https://www.veracode.com/security/static-code-analysis 4 pages (date unknown).

Tice et al., "Enforcing Forward-Edge Control-Flow Integrity in GCC & LLVM", 23rd USENIX Security Symposium, Aug. 2014, 16 pages.

Sun et al., "How to Survive the Hardware-assisted Controlflow Integrity Enforcement", 2019, 61 pages.

Popa, "Binary Code Disassembly for Reverse Engineering" https://www.researchgate.net/publication/235611044_Binary_Code_Disassembly_for_Reverse Engineering pp. 233-248 (2012).

Miranti et al., "x86-64 Instruction", https://www.cl.cam.ac.uk/~jrh13/spisa19/slides_03.pdf 29 pages (Sep. 13, 2019).

Kim, Sun Hyoung, et al., "Refining Indirect Call Targets at the Binary Level", Ntwk and Distrbtd Sys Security (NDSS) Symposium 2021, https://dx.doi.org/10.14722/ndss.2021.24386, Feb. 21, 2021, 18pgs.

Chacko et al., "Validation of Embedded Software through Static Analysis of Machine Codes" https://ieeexplore.ieee.org/abstract/document/4809256 1596-1601 (Mar. 6-Jul. 2009).

Cha et al., "How'd Security Benefit Reverse Engineers?", 2022 IEEE/IFIP DSN, DOI: 10.1109/DSN53405.2022.00061, Jun. 2022, 8pgs.

Abadi et al., "Control-Flow Integrity", https://archive.vsecurity.info/15487-s18/papers/Abadi%20et%20al._2005_Control%20Flow%20Integrity.pdf 14 pages (2009).

"Control-Flow Enforcement Technology (CET)", Chapter 18, vol. 1, Dated Jun. 1, 2022, 14 pages.

"A Technical Look at Intel's Control-flow Enforcement Technology", 3 pages (Jun. 13, 2020).

* cited by examiner

FIG. 1

COMPUTER 100

EXECUTABLE CODE 110

| BYTE ARRAY 120 | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| ALIGNMENT 131 | INSTRUCTION A | | B | JUMP TARGET INDICATOR INSTRUCTION C | | | | DIRECT BRANCH INSTRUCTION D | | JUMP INSTRUCTION E | | | |
| ALIGNMENT 132 | | UNCOND. JUMP INSTR. F | | INSTRUCTION G | | | | JUMP TARGET INDICATOR INSTRUCTION H | | | | JUMP INSTRUCTION I | | |

| | OPCODE 171 | OPERAND 181 | OPCODE 172 | OPERAND 182 | OPERAND 183 |
|---|---|---|---|---|---|

BACKLOG 140

| ITERATION | | | | | | | |
|---|---|---|---|---|---|---|---|
| T0 | C | H | | | | | |
| T1 | H | D | | | | | |
| T2 | | D | I | | | | |
| T3 | | | I | F | | E | |
| T4 | | | | F | | E | |
| T5 | | | | | | E | |

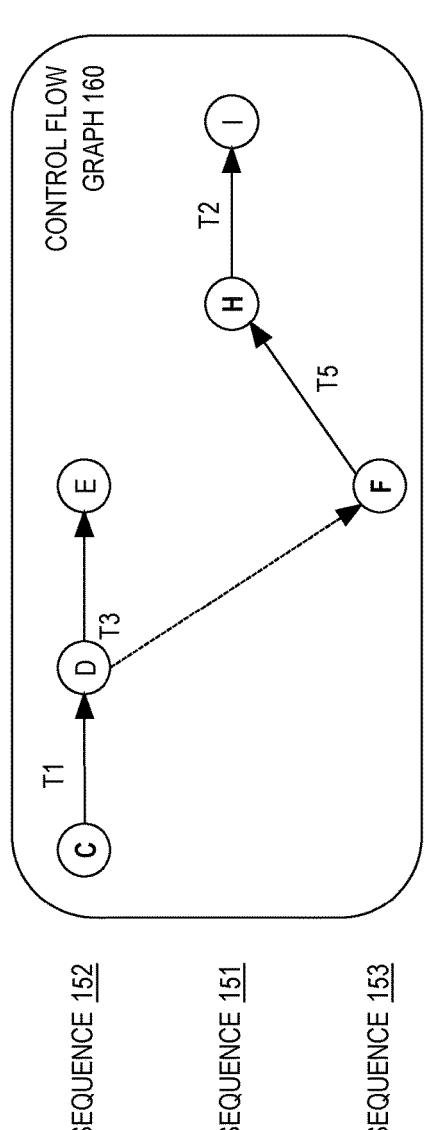

CONTROL FLOW GRAPH 160

SEQUENCE 152

SEQUENCE 151

SEQUENCE 153

201 Detect first sequence of instructions in sequence of bytes of executable code 202 Based on first sequence of instructions, detect second sequence of instructions in sequence of bytes of executable code 203 Based on all discovered sequences of instructions, generate control flow graph 204 Based on control flow graph, detect security violation in executable code

SOFTWARE SYSTEM 400

402

402A

APPLICATION PROGRAM 1

402B

APPLICATION PROGRAM 2

402C

APPLICATION PROGRAM 3

[...]

402N

APPLICATION PROGRAM N

OPERATING SYSTEM
(e.g., WINDOWS, UNIX, LINUX, MAC OS, IOS, ANDROID, OR LIKE)

410

GRAPHICAL USER INTERFACE (GUI)

415

VIRTUAL MACHINE MONITOR (VMM)

430

BARE HARDWARE (e.g., COMPUTING DEVICE 300)

STATIC VALIDATION OF MACHINE CODE FOR SECURITY PROPERTIES

CROSS-REFERENCE TO RELATED APPLICATION; BENEFIT CLAIM

This application claims the benefit of Provisional Application 63/627,318, filed Jan. 31, 2024, the entire contents of which are hereby incorporated by reference as if fully set forth herein, under 35 U.S.C. § 119 (e).

FIELD OF THE INVENTION

The present invention relates to static validation of machine code. For detecting policy violations, herein are accelerated techniques to analytically generate a control flow graph from misaligned (i.e. overlapping) sequences of instructions.

BACKGROUND

A security boundary that distinguishes between privileged and unprivileged entities (e.g. users or accounts) typically requires an enforcement mechanism that distinguishes privileged and unprivileged operations and manages access to those. On common computing hardware, a central processing unit (CPU) implements this enforcement mechanism such that privileged instructions can only be executed in kernel mode, which is a privileged mode available for use only by the operating system (OS) kernel. If execution of a privileged instruction is attempted in the unprivileged mode used for user programs, the CPU will interrupt execution of the user program and raise a signal to the privileged kernel code. For example, the signal may be an implementation of an interrupt, a fault, a violation, a trap, an exception, an error, or an event.

If a security boundary is to be established without hardware support, all code that is executed has to be inspected. One way to do this is to use a dynamic binary translator in process, but this is slow. Static analysis is an option, but variable-sized instruction length of different instruction set architectures (ISA), such as Intel x86, combined with indirect control flow transitions whose computed targets depend on runtime data make static analysis a technically challenging task. For example, variable instruction width makes detecting whether a computed target address is or is not the first byte of a valid multibyte instruction in a valid instruction sequence a technical challenge. For example, multiple instruction sequences may overlap, and statically detecting whether none, some, or all of the instruction sequences are unreachable or valid is a technical challenge Return-oriented programming (ROP) and Call-oriented programming (COP) attacks dynamically manipulate control flow in ways that may be difficult for static analysis to detect.

BRIEF DESCRIPTION OF THE DRAWINGS

In the drawings:

FIG. 1 is a block diagram that depicts an example computer that statically validates executable machine code consisting of machine instructions of an instruction set architecture (ISA);

DETAILED DESCRIPTION

Figure 2:
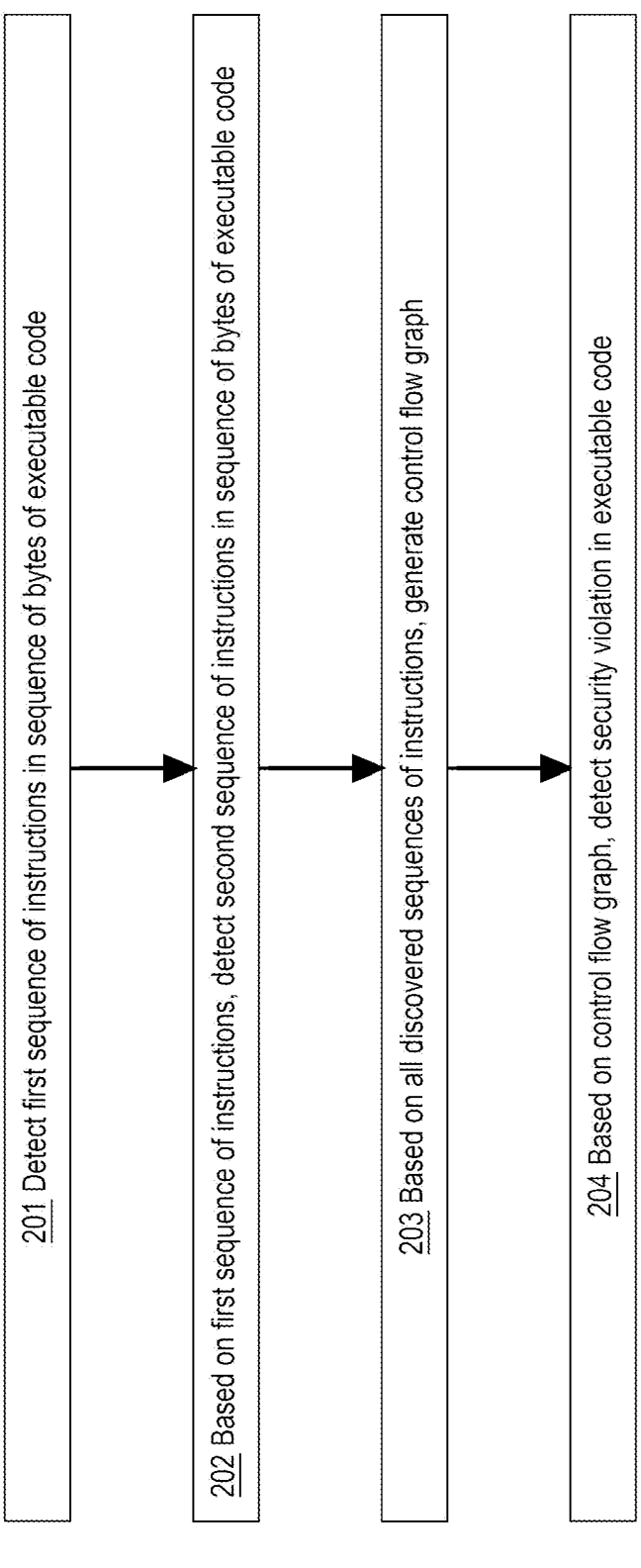
FIG. 2 is a flow diagram that depicts an example computer process that security validates all or part of an untrusted executable such as a text (i.e. code) segment in an executable and linkable format (ELF) file on Linux from an untrusted source.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Here is static validation of machine code for detecting policy violations in an accelerated way that analytically generates a control flow graph from misaligned sequences of instructions that may, for example, partially overlap (i.e. share some of the bytes) in a memory buffer. This approach is a static executable machine code verifier whose goal is to disassemble a binary program and verify that it adheres to specific security policies through static analysis that does not execute the program. Given an executable in binary form, i.e., machine code, such as an Executable and Linkable Format (ELF) file on Linux from an untrusted source, a technologic problem is to check, before execution of a program, whether certain security properties are complied with or violated by the program. For example, machine code might contain privileged instructions or forbidden software patterns that violate an assumption required for secure execution of the program. Requiring just minimal control flow restrictions on a runtime environment, the approach herein can more or less exhaustively validate all machine code via static analysis before execution. For example, this non-invasive approach can validate an executable file that lacks execute permission.

In a first analytic phase, entry points into machine code are discovered. The entry points are starting points of control flow analysis that generates a directed control flow graph (CFG) in a second analytic phase. Novel graph analytics herein detect security violations in the machine code. In a third analytic phase, interchangeable and combinable security policies implement the graph analytics in a flexible way that can be customized for a processor and its instruction set architecture (ISA). This approach increases the security (i.e. reliability) of any computer that executes the machine code, which can be quantified by a decrease in a computer performance metric such as a count or frequency of a particular computer operational event such as a crash, a corruption or exfiltration of data, or an execution of malicious logic. This approach will quantifiably increase the reliability of a computer that executes untrusted code such as an open source library or tenant logic in a multitenant environment such as a public cloud.

1.0 Example Computer

FIG. 1 is a block diagram that depicts an example computer 100 that statically validates executable code 110 that is machine code consisting of machine instructions A-I. For detecting policy violations, computer 100 uses accelerated techniques to analytically generate control flow graph 160 from misaligned instruction sequences 151-153 that are discovered in a novel way in executable code 110. Computer 100 may be one or more of a rack server such as a blade, a personal computer, a mainframe, or a virtual computer. All of the components shown in FIG. 1 may be stored and operated in random access memory (RAM) of computer 100.

1.1 Executable Code is Machine Instructions in a Byte Array

Executable code 110 is stored in byte array 120 that contains bytes 0-14 that are identified by their zero-based offsets within byte array 120. A technical challenge is that which of instructions A-I occur in byte array 120 depends on which of alignments 131-132 is used to determine which bytes are part of which instructions. For example, bytes 9-10 are: a) part of instruction H in alignment 132 and b) respective parts of instructions D-E in alignment 131. Alignments 131-132 demonstrate that executable code 110 may contain instructions and instruction sequences that are misaligned and are partially overlapping relative to each other.

Instructions may contain different respective counts of bytes. For example, instructions variously consist of 1-15 bytes in the Intel x86 instruction set architecture (ISA). Techniques herein are generalized, do not require an x86 ISA, and may instead be used with other ISAs such as RISC-V or ARM. Each of instructions A-I consists of an opcode and, depending on the opcode, zero or more operands. For example, instruction G has more operands than instruction F (shown as uncond. jump instr. F), and instructions C and H have no operands.

An operand may be implicit or explicit. Operands 181-183 are explicit operands, which means that each is stored in separate byte(s). For example, operand 182 contains more bytes than either of operands 181 or 183.

1.2 Instruction Set Architecture (ISA)

As shown, opcode 172 in instruction G consists of byte 4, and opcode 171 in instruction F consists of bytes 1-2. In the Intel x86 instruction set architecture (ISA), two instructions that have a same opcode may contain different respective counts of bytes and different respective counts of explicit (i.e. physically present in the bytes of the instruction) operands. For example in the x86 ISA, the PUSH opcode is a single byte that may be part of either a PUSH BX instruction or a PUSH zero instruction, and both of those instructions contain a second byte to specify an explicit operand that may be: a) a register of a processor such as a central processing unit (CPU), b) a RAM location whose address is in a register, or c) a constant (i.e. an immediate value). For the same PUSH opcode, PUSH AX is a one-byte instruction that does not have a separate operand byte. In other words, AX is an implicit operand.

A processor such as a central processing unit (CPU) has an instruction set architecture (ISA) that contains all of the distinct opcodes, and that processor can individually execute all of instructions A-I. The ISA of that processor may or may not be the same as the ISA of computer 100.

That processor may have a program counter (PC) that indicates which instruction is the processor currently executing. For example, the PC may contain a whole or partial memory address of the instruction's location in memory. After executing a previous instruction, the PC is incremented by the size (i.e. byte count) of the previous instruction so that the PC will contain the address of the next instruction to be executed in a linear sequence of adjacent instructions.

1.3 Various Kinds of Jump Instructions

An opcode of an instruction indicates which operation will occur when the instruction executes. Herein, a jump opcode is any opcode designed to switch execution from a previous instruction sequence to a next instruction sequence, and a jump instruction is any instruction with a jump opcode. A jump instruction has an implicit or explicit jump target, which is the address of the first instruction in the next instruction sequence, and jumping occurs by loading the target address into the PC. An explicit jump target is an operand of the jump instruction. An implicit jump target is a target address implicitly provided by the processor.

An explicit jump target may be direct (i.e. static) or indirect (i.e. dynamic). A direct jump target is specified by value as a constant in the jump instruction itself. An indirect jump target is specified by reference, in an indirect operand of the jump instruction, to a processor register or memory location that contains a jump target address that was previously computed. Herein, an indirect target may be referred to as a computed target. A technical challenge is that an indirect target cannot be statically resolved.

A jump opcode may be conditional or unconditional. Herein: a) a branch is a conditional jump, b) a branch opcode is a conditional jump opcode, c) a branch instruction is a conditional jump instruction, and d) a branch target is the jump target of a branch instruction. Unlike an unconditional jump that has only one next instruction sequence, a branch has two possible next instruction sequences that are: a) switching to the branch target instruction sequence and b) continuation of the current instruction sequence. A branch instruction has an indirect operand that specifies a processor register or memory location that contains a computed value. Execution of the branch instruction calculates a Boolean value by comparing that computed value to one of: a) a constant in an operand of the branch instruction, b) a constant implied by the instruction's opcode such as zero, or c) another computed value specified by reference in another indirect operand. The comparison may use any so-called relational operator such as inequality to calculate the Boolean value that is the result of the comparison. If the Boolean is false, the current instruction sequence continues to execute with the next instruction. If the Boolean is true, execution switches to the branch target instruction sequence. A technical challenge is that the Boolean value and whether or not execution will switch instruction sequences cannot be statically resolved.

Herein, a call instruction is a special kind (i.e. opcode) of unconditional jump instruction that invokes a subroutine in a target instruction sequence. A C++ virtual function is an example of a subroutine that would be invoked by an indirect call instruction. Herein, a subroutine consists of instruction sequence(s) that each may end with a return instruction. Herein, a return instruction is a special kind (i.e. opcode) of unconditional indirect jump instruction that resumes the call instruction's instruction sequence.

1.4 Control Flow Integrity (CFI)

Control flow integrity (CFI) is a capability of software and/or processor hardware to detect and enforce control flow patterns caused by jump instructions. For example, a jump target address must be a valid memory address. Herein, hardware CFI includes a reserved (i.e. predefined) opcode referred to as a jump target indicator. The opcode of the target instruction of a jump should be a jump target indicator such as the ENDBR64 opcode of the Intel x86_64 ISA, in which case the target instruction is referred to as a jump target indicator instruction. In other words, the first instruction of a target instruction sequence should be a jump target indicator instruction. Herein, every instruction sequence should start with a jump target indicator instruction.

A jump target indicator instruction executes in a same way as a no operation (noop) instruction that does nothing and whose execution is, like most instructions, followed by execution of the next instruction in its instruction sequence. With hardware CFI, execution of a jump instruction fails if the jump target is not a jump target indicator instruction. Failed execution of any instruction causes execution of the current instruction sequence to cease, which may cause an implementation-specific reaction such as raising an interrupt or halting program execution.

1.5 First Static Analysis Phase Scans for Entry Points

The approach herein has a sequence of three phases that are a scanning phase, then a construction phase, and then a policy phase. In an embodiment, every instruction sequence should start with a jump target indicator instruction, and the scanning phase discovers an initial set of instruction sequences in executable code 110 by linearly scanning byte array 120 for occurrences of the jump target indicator opcode that may be a predefined multibyte constant. For example, each of instructions C and H may be an ENDBR64 instruction that is a four-byte instruction that has no operands and has a four-byte opcode. Byte array 120 may contain zero, one, or multiple occurrences of the jump target indicator opcode at distinct respective locations in byte array 120.

The four bytes of an occurrence of the jump target indicator opcode might, for example, be bytes 0-3 or bytes 11-14, and the first byte of the four bytes might occur at an arbitrary byte somewhere in byte array 120. However, the first byte of the four bytes cannot occur in bytes 12-14 because the four bytes would not fit within byte array 120. Thus, the scanning phase only has to inspect bytes 0-11 when scanning for the first byte of an occurrence of the jump target indicator opcode.

Because the ENDBR64 opcode consists of four distinct byte values, two occurrences of the ENDBR64 opcode cannot overlap. For example if bytes 3-6 contain a first occurrence of the ENDBR64 opcode, then the first byte of a second occurrence of the ENDBR64 opcode cannot occur in any of bytes 4-6. Thus after discovering that shown instruction C is an ENDBR64 instruction in bytes 3-6, scanning may skip to byte 7 to continue scanning for a second occurrence of the ENDBR64 opcode. Instructions C and H are shown bold to indicate that they are jump target indicator instructions whose respective first byte the scanning phase discovered at bytes 3 and 8. Thus, executable code 110 has two jump target indicator instructions.

Herein, the first instruction in an instruction sequence is referred to as a starting point instruction. A valid starting point instruction is a jump target indicator instruction. In an embodiment, any other starting point instruction is invalid per CFI, and executable code 110 may contain zero or more invalid starting points. The construction phase processes starting points as discussed below.

1.6 Analytic Backlog of Pending Instructions

The scanning phase adds all discovered jump target indicator instructions into backlog 140 that may be any ordered or unordered collection data structure that does or does not enforce uniqueness of elements. An embodiment may be implemented with the Java high level language (HLL). For example, backlog 140 may be any class that implements the java.util.Collection interface such as a java.util.Queue that is ordered and allows duplicates or may be a java.util.Set that is unordered and forbids duplicates. In an embodiment and by design as discussed later herein, adding a duplicate into backlog 140 is never attempted. Thus, backlog 140 always contains only distinct instructions. Backlog 140 contains instructions having any opcode, including instructions that are not starting points as discussed later herein.

The lifecycle of backlog 140 entails a sequence of iterations T1-T4. Technically, T0 is not an iteration but instead is the initial state of backlog 140 as populated by the scanning phase. Thus at iteration T0, backlog 140 contains only instructions C and H as shown. Herein, the lifecycle of an instruction entails exactly one transition from pending to not pending. When computer 100 first discovers an instruction, whether during the scanning phase or the construction phase, the instruction is pending that entails decoding the instruction and adding it to backlog 140. As discussed later herein, when the instruction is removed from backlog 140 the instruction becomes and remains no longer pending.

1.7 Each Instruction is Decoded Exactly Once

At any time in the scanning phase and the construction phase, all instructions discovered so far are decoded instructions, whether pending or not, which does not mean that all instructions have already been discovered in byte array 120. Backlog 140 contains only pending instructions.

Herein, a wrapper is a data structure or an instance of a class such as according to a gang of four (GoF) structural software design pattern such as the decorator or object adaptor patterns. Decoding an instruction entails wrapping the instruction in a wrapper that has data fields as discussed later herein. Decoding initializes some fields and leaves some other fields uninitialized as discussed later herein. Herein, an instruction may simultaneously exist in two forms that are: a) a raw instruction that consists of the bytes of the instruction in byte array 120, which does not reveal which instruction sequence contains the instruction and b) a decoded instruction that is wrapped in a wrapper. A wrapper field may be initialized or uninitialized, and may initially or eventually be assigned a value that might be null. Thus herein, uninitialized and null are one or two reserved (i.e. predefined) special values.

A field in a wrapped instruction may refer to another instruction, which entails linking two instructions and transitively, for a long instruction sequence or multiple interconnected sequences, many linked instructions. Thus, an instruction sequence may simultaneously exist in two forms that are a sequence of bytes in byte array 120 and a doubly-linked list of decoded instructions as discussed later herein. A referenced instruction is uniquely identified by any of: a) the offset, in byte array 120, of the first byte of the raw instruction, b) the memory address of the first byte of the raw instruction, and c) the memory address of the instruction's wrapper. Every decoded instruction has a field that references the decoded instruction's raw instruction in byte array 120.

1.8 Second Static Analysis Phase Iteratively Constructs Control Flow Graph (CFG)

The construction phase iteratively operates backlog 140 in iterations T1-T3 as follows. Each of iterations T1-T3 begins by removing one instruction from backlog 140, referred to herein as the current instruction. For example as shown, iteration T1 removes instruction C. Once removed, an instruction will never be readded back into backlog 140. Depending on the embodiment, backlog 140 may ignore an attempt to readd, or computer 100 may otherwise track which instructions were already previously added and not attempt to readd. It does not matter if a previously added instruction was removed or is still in backlog 140, in any case, the instruction will never be readded.

The construction phase decodes zero, one, or two instructions per iteration, which is not the current instruction. Although already decoded in an earlier iteration, adjusting the current instruction entails populating, if not already populated, additional wrapper fields including: a) a field that contains a reference to a next instruction in the instruction sequence that is null if the instruction is the last instruction in the instruction sequence, and b) a field that contains a reference to a jump target instruction in a different instruction sequence that is null if the instruction is not a jump instruction or if the jump target is indirect. A pending instruction's next instruction field is uninitialized until the instruction is no longer pending, which is when the instruction becomes the current instruction.

A return instruction has neither a next instruction nor a jump target instruction. A call instruction and its next instruction are in a same instruction sequence. The jump target of a direct call instruction is the first instruction in the called subroutine.

As discussed above, instruction C is the current instruction of iteration T1. How many bytes are in instruction C may be detected based on the opcode of instruction C. As shown, after four bytes 3-6 of instruction C is next byte 7 that is the first byte of next instruction D in the instruction sequence. In the shown example, iteration T1 entails decoding next instruction D, which initializes instruction D's raw instruction field with the address or offset of next byte 7, and instruction D is added to backlog 140. Thus, an iteration always removes a current instruction from backlog 140 and usually will add exactly one instruction into backlog 140 that is the next instruction in the instruction sequence.

The current instruction and next instruction are doubly linked as follows. The current instruction's next instruction field is assigned to reference the next instruction. The next instruction's previous instruction field is assigned to reference the current instruction. In that way, the next instruction is appended onto the doubly-linked list of the instruction sequence. An initialized previous instruction field never references a pending instruction.

1.9 Directed Edges In CFG

Each vertex in control flow graph 160 represents a distinct instruction. Although an instruction sequence may be a doubly-linked list, the construction phase incrementally generates directed control flow graph 160 which may, for example, be based on treating instruction sequences as singly-linked lists. For example as shown, only one directed edge connects instructions C-D as vertices in control flow graph 160. That edge is instruction C's reference to next instruction D, which is a wrapper field assigned in iteration T1 as discussed above. Creation of that edge in iteration T1 is why that edge is labeled as T1. In other words at the end of iteration T1, control flow graph 160 contains only two instructions C-D and one edge even though instruction D is still pending. Initially in iteration T0, control flow graph 160 is empty. As shown in control flow graph 160, instructions C-D are in sequence 152 that is an instruction sequence (i.e. linked list).

If the current instruction's previous instruction field is uninitialized (i.e. the current instruction was added to backlog 140 by the scanning phase), then the construction phase generates a new instruction sequence. For example when instruction C is removed from backlog 140 in iteration T1, sequence 152 is created and, later in iteration T2, sequence 151 is created when instruction H is removed from backlog 140 to become the current instruction. Thus at the end of iteration T2, control flow graph 160 contains instructions C-D in sequence 152 and instructions H-I in sequence 151. At the end of iteration T2, control flow graph 160 is disconnected (i.e. contains sequences 151-152 as unconnected graph components).

As shown, no iteration has a current instruction that is a jump instruction until iteration T3 when direct branch instruction D becomes the current instruction. Decoding of direct branch instruction D assigns its reference fields to refer to next instruction E and branch target instruction F. Thus as shown in control flow graph 160, iteration T3 creates both of an edge between instructions D-E and, shown dashed to indicate a branch that connects one instruction sequence to another, an edge between instructions D and F.

Execution of direct branch instruction D might cause switching instruction sequences to execute branch target instruction F, as shown by the dashed edge. In other words, instruction F might execute immediately after instruction D, which is why instructions D and F are directly connected in control flow graph 160. While instruction D is the current instruction, iteration T3 discovers and decodes both instructions E-F. Decoding instructions E-F entails generating the dashed edge in control flow graph 160 by: a) initializing a jump target field in instruction D to refer to instruction F, b) creating new sequence 153 to contain pending instruction F, and c) initializing the previous instruction field in both instructions F and E to refer to instruction D.

Jump instruction I is the current instruction in iteration T4. As discussed earlier herein, jump instruction I may or may not be conditional and may or may not be direct, which has the following implications and example scenarios Y-Z. An indirect unconditional jump never has a next instruction nor a jump target instruction. Thus, an indirect unconditional jump can only be the last instruction in an instruction sequence, which is scenario Y discussed below. A control flow graph will not change in any iteration whose current instruction is an indirect unconditional jump. For example as shown in control flow graph 160, instruction I was earlier added as a vertex in iteration T2.

In an embodiment: a) an unconditional direct jump keeps a reference to its target instruction in the next instruction field, not the jump target instruction field, and b) the target instruction is in the same instruction sequence as the jump instruction. In that case, an instruction sequence may for example: a) contain multiple unconditional direct jump instructions, b) not be connected to any other instruction sequence, and c) contain instructions from distinct respective alignments.

Scenario Z does not occur in the x86_64 ISA that lacks an indirect branch opcode. In scenario Z, instruction I is an indirect branch that occurs at the end of byte array 120, and byte array 120 has no more bytes for a next instruction. In that case, instruction I is the end of the instruction sequence, and instruction I's next instruction field is initialized to null or a reserved value that indicates that the instruction sequence exceeds byte array 120, which might be a violation as discussed later herein.

Either of scenarios Y-Z in iteration T4 is unlike all previous iterations T1-T3, because control flow graph 160 is unchanged in iteration T4, which is why T4 is not shown in control flow graph 160.

In iteration T5 in this example, instruction F is an unconditional jump instruction whose next instruction field refers to instruction H. Each of instructions F and H remain a first instruction in respective sequences 153 and 151 even though sequences 151 and 153 become connected in iteration T5. In that case, instruction H occurs in both instruction sequences 151 and 153.

In unshown iteration T6, the current instruction is jump instruction E that may or may not be conditional and may or may not be direct. Above scenarios Y-Z in iteration T6 would mean that bytes 13-14 are not part of any instruction. If instruction E is a branch, two bytes 13-14 might be sufficient to provide zero, one, or two more instructions. For example if byte 13 is the opcode of a three-byte instruction, then bytes 13-14 are insufficient and unused herein for instruction sequence 152.

There is no iteration T7 because iteration T6 empties backlog 140. In that case, iterating and the construction phase cease. Instructions A-B and G are not in control flow graph 160 because instructions A-B and G are unprocessed (i.e. not decoded and never were pending). For example in alignment 132, unprocessed instruction G occurs between processed instructions F and H. Likewise, bytes 0 and 13-14 are not used in some instruction sequence(s).

1.10 State of the Art Control Flow Structure

In the state of the art, a basic block is a sequence of instructions that is designed to atomically execute as a whole. That is, execution of the basic block would always start with the first instruction in the basic block and always end with the last instruction in the basic block. Thus, instruction sequence 152 is not a basic block because its execution may variously end at, depending on the branch condition of instruction D, either of instructions D-E.

Basic blocks are composable such that any sequence of instructions that is not a basic block is instead, by definition, composed of multiple basic blocks. For example, instruction sequence 153 is not a basic block because various executions may begin at either of starting instructions F or H, which means that instruction sequence 153 contains two basic blocks and sequence 151 contains one basic block.

As shown, control flow graph 160 is an extreme example in which, incidentally (i.e. not by design), each edge represents a distinct basic block. Usually a basic block consists of a linear sequence of many instructions and, herein, many instructions would entail many edges. For example, instruction sequence 152 contains three instructions C-E and two basic blocks.

2.0 Example Static Validation Process

FIG. 2 is a flow diagram that depicts an example process that any computer herein may perform to security validate all or part of an untrusted executable such as a text (i.e. code) segment in an executable and linkable format (ELF) file on Linux from an untrusted source. Here are example embodiments U-W that validate at respective times. In reactive embodiment U, one code segment may load and execute before causing dynamic loading and executing of another code segment. For example, the process of FIG. 2 may be performed by a dynamic linker and loader, and loading causes validation of a code segment that either succeeds or the executable program is terminated.

In proactive embodiment V, static linking (e.g. without a loader) of object module(s), such as a code library, causes validation of the code library that, if successful, cryptographically signs and persists the code library or a whole executable. Later, the signed code can be repeatedly trusted, loaded, and executed without validation. Hybrid embodiment W combines embodiments U-V, and the dynamic linker and loader can sign code that was not loaded until after the executable program had already executed for awhile and still is executing. Thus, the process of FIG. 2 may occur for: a) an object module, a code library, or an executable program that is undeployed and being built, b) an executable program that is being loaded and soon will execute, or c) an already running executable program.

The process of FIG. 2 entails static analysis that does not require execution of executable code 110 nor execute permission on a file containing executable code 110. The scanning phase (i.e. iteration T0) occurs before step 201 as discussed earlier herein. The construction phase performs steps 201-203. Because the construction phase processes each instruction exactly once, the time complexity of security validation herein is linear with respect to a count of instructions in executable code 110, which is accelerated over the state of the art.

Steps 201-202 discover respective instruction sequences 152-153. Step 201 detects instruction sequence 152 in alignment 131 in executable code 110 in byte array 120. For example in iteration T3, all of instruction sequence 152 has been discovered.

Based on instruction sequence 152, step 202 detects instruction sequence 153 in alignment 132 in executable code 110 in byte array 120. For example in iteration T3, instruction sequence 153 is discovered as a branch target of instruction D in sequence 152. In iteration T5, all of instruction sequence 153 has been discovered.

Steps 201-202 are sub-steps of step 203. For example, an instruction sequence may be completely discovered or connected to another sequence even though some sequences still are undiscovered and, in that way, control flow graph 160 is incrementally discovered and constructed. Based on all discovered instructions sequences 151-153, step 203 incrementally generates control flow graph 160.

The policy phase performs step 204. By analyzing control flow graph 160, step 204 detects a security violation in executable code 110. In an embodiment, computer 100 is manually preconfigured with multiple security policies. Herein, a security policy is analytic logic that statically analyzes control flow graph 160 to detect whether or not control flow graph 160 conforms to a particular pattern or rule. Validation by step 204 of executable code 110 fails if any security policy is violated. Validation is adjustable and may be made stricter by including an additional security policy or relaxed by excluding a policy. Thus, validation by step 204 is extensible by addition or replacement with custom security policy(s).

2.1 Policy-Driven Graph Analytics

The following are example security policies. Each policy performs a special analytic detection in control flow graph 160. The detection determines whether validation succeeds or, due to a violation, fails. Each of the following special detections of respective violations may be performed by a distinct respective security policy. Some security policies may analyze a sliding peephole that consists of a current instruction. For example, a boundary violation of a control flow integrity (CFI) policy occurs if a direct jump instruction in the peephole is detected that specifies a target that is not in byte array 120.

Some security policies may analyze a relation between two instructions, such as between a jump instruction and its jump target instruction. For any security policy herein that entails two instructions that are not physically adjacent in byte array 120, the two instructions may occur in respective distinct instruction sequences and/or in respective distinct alignments in byte array 120. For example, any of the following security policies may entail two misaligned (i.e. in distinct respective alignments) instruction sequences.

A CFI violation occurs if a jump instruction specifies a target that is not a jump target indicator instruction. In an embodiment, the CFI violation only occurs for indirect jumps. A violation occurs if an instruction has an opcode that is not in a predefined whitelist. For example, virtual memory or a shadow stack may be secured by forbidding the Write Data to User Page Key Register (WRPKRU) opcode of the x86 instruction set architecture (ISA).

2.2 Pluggable CFI Policies

Depending on the processor, a shadow stack may or may not be implemented and, if so, may or may not be implemented entirely in hardware. Depending on a processor, control flow integrity (CFI) may be implemented entirely in hardware (e.g. hardware shadow stack), entirely in software or, in the case of the ENDBR64 opcode, in the ISA of the processor. Depending on which one, software CFI by any security policy herein may or may not be redundant to hardware CFI. For example, a software CFI policy may pass (i.e. successfully validate, i.e. not detect a violation) only when control flow graph 160 contains expected control flow instrumentation (i.e. additional instructions according to an instrumentation pattern). Because control flow instrumentation may cause computational latency or thrash a hardware cache, some or all control flow instrumentation may be avoided if the processor has sufficient hardware CFI. Thus, a software CFI policy is an example of an optional security policy that computer 100 may sometimes be configured without. In other words, security policies herein are pluggable (i.e. can be mixed in), and which subset of security policies to use may depend on the security objectives, the ISA, and the processor.

In an embodiment, the control flow instrumentation is an indirect jump instruction that replaced, in an instruction sequence, a subroutine return instruction. A CFI policy may detect and forbid a return instruction, and this policy may be excluded if the processor has a shadow stack.

A CFI policy may enforce the presence of software instrumentation that provides Spectre mitigation. This policy verifies that a jump target is an instruction sequence that contains a load (i.e. load-load and load-store) fence (LFENCE) instruction within a threshold few instructions, such as the first two instructions, such as immediately after an ENDBR that is the first instruction in the instruction sequence.

CFI instrumentation may consist of subsequence(s), in a same or distinct respective instruction sequence, and each instrumentation subsequence may contain multiple instructions. A CFI policy may use reverse pattern matching to tolerate interleaved non-interfering instructions due to out-of-order execution and instruction scheduling used for multithreading such as with multiple cores or hyperthreading. Below are two example CFI patterns 1-2 that are respectively shown in the following example assembly pseudo-codes. Example CFI patterns 1-2 read the bytes at the target location and compare them with the value defined by the bytes of the jump target indicator opcode. More precisely, the comparison is done using arithmetic addition, and the constant value added is the additive inverse of the jump target indicator instruction (e.g. ENDBR64) to avoid embedding in the code buffer unwanted entry points that would be found during the disassembly process. Regarding the interleaved instructions, only the following subset of the instructions that respect one of the following criteria is successfully validated by a CFI policy:

Instructions that do not modify any general purpose register,

Instructions that modify a single register that is the first explicit operand of the instruction, and Instructions that do not modify the CPU flags (i.e. condition codes).

Here are example CFI patterns 1-2.

```
# CFI pattern 1
mov reg2, [reg]
add reg2, MAGIC_VALUE  ;  compare via
arithmetic to avoid creating an entry point
jnz "position with int3" ; jumps if the result
of the addition is different from 0
lfence
jmp/call reg . . .
int3 (target of jnz)
# CFI pattern 2
mov reg2, [reg]
add reg2, MAGIC_VALUE  ;  compare via
arithmetic to avoid creating an entry point
je succeed      ;  jumps if the result of the
addition is different from 0 int3
succeed:
  lfence
jmp/call reg
```

In an embodiment, the process of FIG. 2 causes display of each of instruction sequences 151-153 is a distinct respective disassembly (i.e. listing of assembly language instructions as text), and each disassembled instruction sequence is accompanied by a set of zero or more policy violations that may, for example, indicate particular instruction(s) that violated a particular policy.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
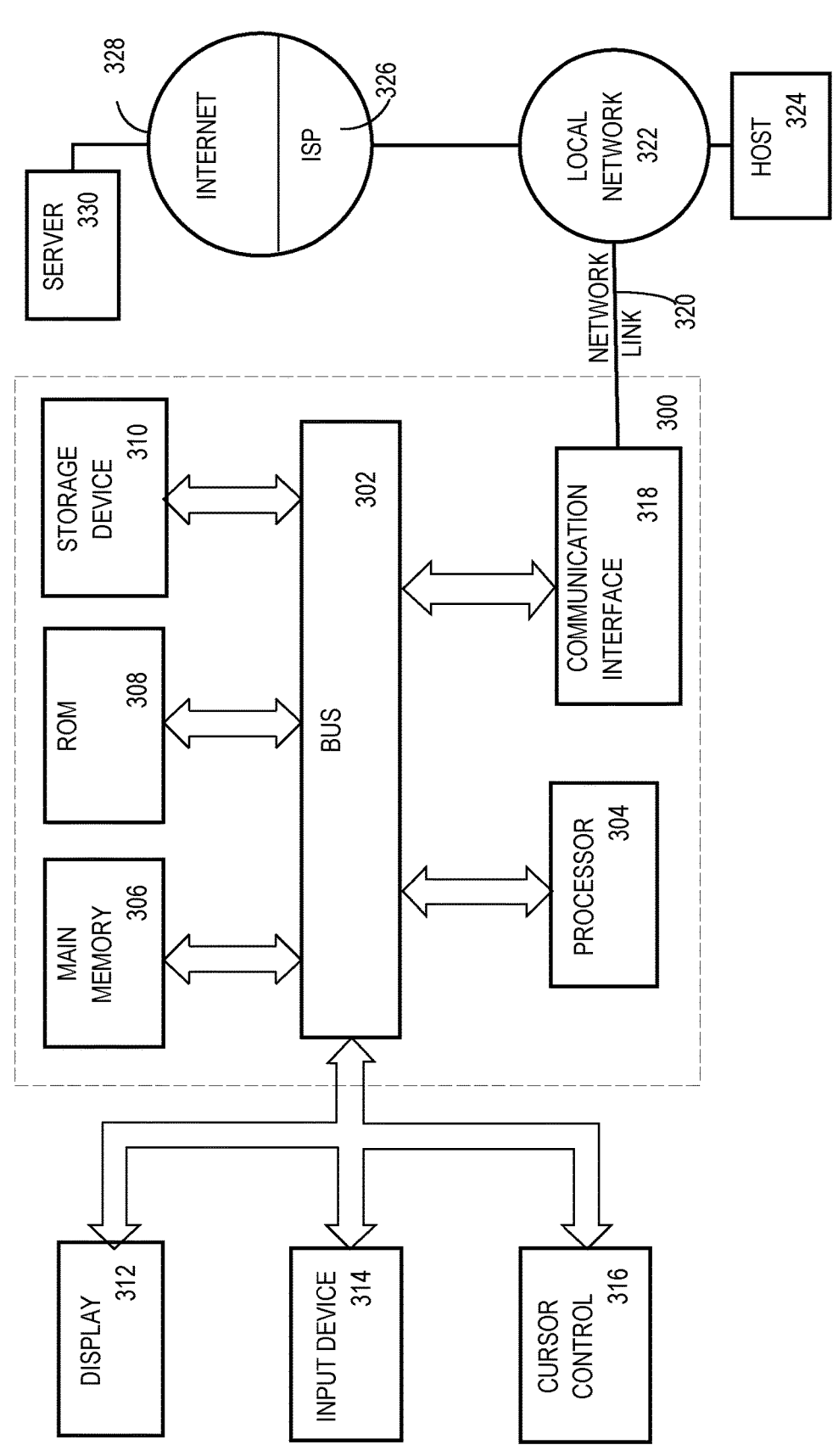
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Software Overview

Figure 4:
FIG. 4 is a block diagram that illustrates a basic software system that may be employed for controlling the operation of a computing system.

FIG. 4 is a block diagram of a basic software system 400 that may be employed for controlling the operation of computing system 300. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing system 300. Software system 400, which may be stored in system memory (RAM) 306 and on fixed storage (e.g., hard disk or flash memory) 310, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 310 into memory 306) for execution by the system 400. The applications or other software intended for use on computer system 300 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 304) of computer system 300. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 300.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 300 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

detecting, in a sequence of bytes of executable code for an instruction set architecture (ISA), a first sequence of instructions that consists of a subsequence of the sequence of bytes of executable code that contains: a) two adjacent instructions and b) an occurrence of a multibyte constant that contains: i) a byte of a first instruction of the two adjacent instructions and ii) a byte of a second instruction of the two adjacent instructions;

detecting, based on the occurrence of the multibyte constant, a second sequence of instructions in the sequence of bytes of executable code;

generating, based on the first sequence of instructions and the second sequence of instructions, a control flow graph; and detecting, based on the control flow graph, a security violation in the sequence of bytes of executable code;

wherein the method is performed by one or more computers without execution of the sequence of bytes of executable code.

2. The method of claim 1 wherein the occurrence of the multibyte constant is a particular instruction.

3. The method of claim 2 wherein the particular instruction is at least one jump target indicator selected from a group consisting of:

an instruction that consists of exactly four bytes, an instruction that contains an operation code (opcode) that consists of exactly four bytes, an instruction that does not contain an operand, an instruction whose execution has no operation, and a jump target indicator that consists solely of distinct byte values.

4. The method of claim 1 wherein the second sequence of instructions is not a basic block.

5. The method of claim 1 wherein:

the first sequence of instructions consists of a first subsequence of the sequence of bytes of executable code;

the second sequence of instructions consists of a second subsequence of the sequence of bytes of executable code;

the sequence of bytes of executable code contains, between the first subsequence of the sequence of bytes of executable code and the second subsequence of the sequence of bytes of executable code, a third subsequence of the sequence of bytes of executable code;

said generating the control flow graph is not based on the third subsequence of the sequence of bytes of executable code.

6. The method of claim 1 wherein said detecting the security violation comprises during static analysis, performing at least one detection selected from a group consisting of:

a detection of a jump instruction that specifies a target that is not a jump target indicator instruction, a detection of an instruction that has an operation code that is not in a whitelist, and a detection that the second sequence of instructions does not contain a fence instruction.

7. The method of claim 1 wherein each vertex in the control flow graph represents a distinct instruction.

8. The method of claim 1 wherein the sequence of bytes of executable code is contained in an executable file that lacks execute permission.

9. One or more non-transitory computer-readable media storing instructions that, when executed by one or more processors without execution of a sequence of bytes of executable code for an instruction set architecture (ISA), cause:

detecting, in the sequence of bytes of executable code, a first sequence of instructions that consists of a subsequence of the sequence of bytes of executable code that contains: a) two adjacent instructions and b) an occurrence of a multibyte constant that contains: i) a byte of a first instruction of the two adjacent instructions and ii) a byte of a second instruction of the two adjacent instructions;

detecting, based on the occurrence of the multibyte constant, a second sequence of instructions in the sequence of bytes of executable code;

generating, based on the first sequence of instructions and the second sequence of instructions, a control flow graph; and detecting, based on the control flow graph, a security violation in the sequence of bytes of executable code.

10. The one or more non-transitory computer-readable media of claim 9. wherein the occurrence of the multibyte constant is a particular instruction.

11. The one or more non-transitory computer-readable media of claim 10 wherein the particular instruction is at least one jump target indicator selected from a group consisting of:

an instruction that consists of exactly four bytes, an instruction that contains an operation code (opcode) that consists of exactly four bytes, an instruction that does not contain an operand, an instruction whose execution has no operation, and a jump target indicator that consists solely of distinct byte values.

12. The one or more non-transitory computer-readable media of claim 9 wherein the second sequence of instructions is not a basic block.

13. The one or more non-transitory computer-readable media of claim 9 wherein:

the first sequence of instructions consists of a first subsequence of the sequence of bytes of executable code;

the second sequence of instructions consists of a second subsequence of the sequence of bytes of executable code;

the sequence of bytes of executable code contains, between the first subsequence of the sequence of bytes of executable code and the second subsequence of the sequence of bytes of executable code, a third subsequence of the sequence of bytes of executable code; said generating the control flow graph is not based on the third subsequence of the sequence of bytes of executable code.

14. The one or more non-transitory computer-readable media of claim 9 wherein said detecting the security violation comprises during static analysis, performing at least one detection selected from a group consisting of:

a detection of a jump instruction that specifies a target that is not a jump target indicator instruction, a detection of an instruction that has an operation code that is not in a whitelist, and a detection that the second sequence of instructions does not contain a fence instruction.

15. The one or more non-transitory computer-readable media of claim 9 wherein each vertex in the control flow graph represents a distinct instruction.

16. The one or more non-transitory computer-readable media of claim 9 wherein the sequence of bytes of executable code is contained in an executable file that lacks execute permission.

* * * * *